Jan. 6, 1970     B. L. BREWER     3,487,957
CHARGING APPARATUS
Filed June 14, 1967
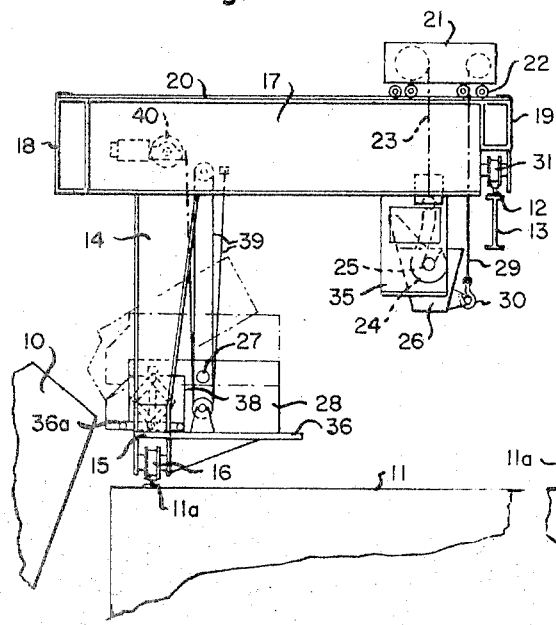
Fig. 1.
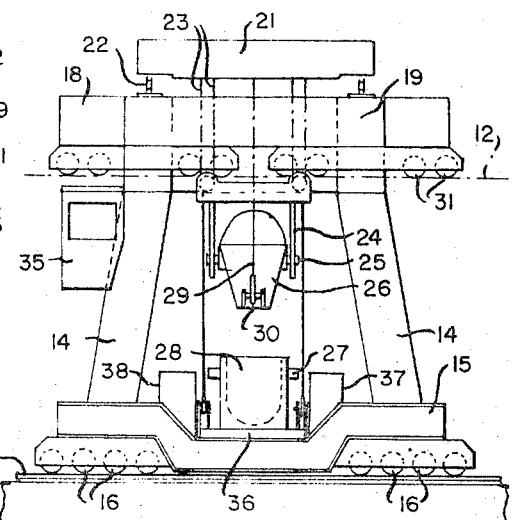
Fig. 2.
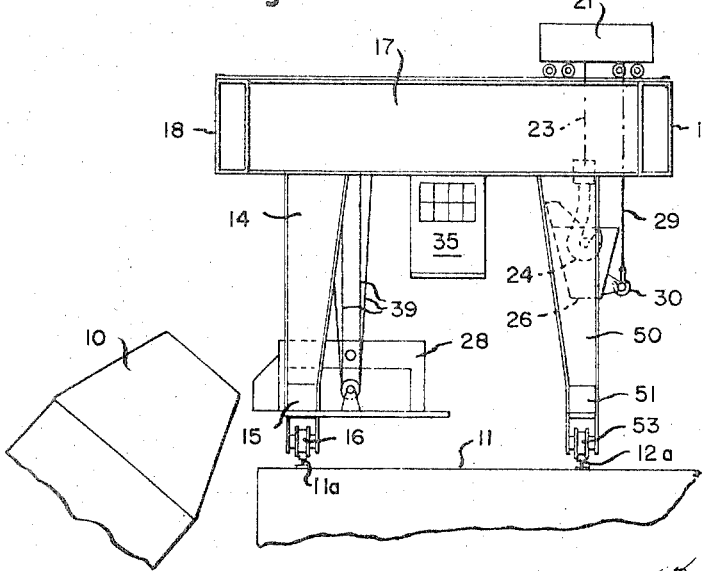
Fig. 3.
Fig. 4.
INVENTOR
Bruce Leroy Brewer United States Patent Office 3,487,957
Patented Jan. 6, 1970

3,487,957
CHARGING APPARATUS
Bruce Leroy Brewer, Alliance, Ohio, assignor to The Alliance Machine Company, a corporation of Ohio
Filed June 14, 1967, Ser. No. 646,062
Int. Cl. B66c 17/08, 5/02, 19/00
U.S. Cl. 214—18                                                    8 Claims

ABSTRACT OF THE DISCLOSURE

A charging apparatus for charging both scrap and hot metal from a single apparatus. The apparatus runs on a charging floor from a loading area to a charging area and provides a scrap carrying and charging means elevatable to a position for discharge into the furnace and an independently operable hot metal carrying and charging means.

---

This invention relates to charging apparatus and particularly to a combination hot metal and scrap charging device for metal refining furnaces. In the refining of iron and steel, it is common practice to charge a mixture of molten blast furnace iron and scrap into a furnace and to refine the same by heating and introducing oxygen either as a fuel and air mixture as in the case of an open hearth furnace or pure oxygen as in the case of BOF type practices. Generally, the scrap is charged with one apparatus such as a charging machine and scrap buggies and the molten metal is charged with an overhead crane mounted on the building framework. These two operations have in the past been a source of considerable delay simply as a result of the problems of placing one apparatus, removing it and replacing it with the other.

I have invented a charging apparatus which can charge both scrap and hot metal from the same apparatus at a rate many times greater than previously possible and without the loss of time characteristic of prior practices.

Preferably, I provide a trackway on a charging floor from a loading area to a furnace, a carriage movable on said trackway from said loading area to said furnace, a trolley trackway on said carriage above the charging floor trackway, a platform or plenum on said carriage movable vertically between the two trackways, means on the carriage for moving said plenum, a removable scrap container on said plenum movable therewith, a trolley movable on the trolley track means and lift means on the trolley for lifting containers of material to be charged. Preferably, the carriage is in the form of a gantry having vertical legs carrying a gantry bridge transverse to the charging floor runway and carrying a trackway for a charging trolley. The plenum is preferably movable between two vertical legs at the charging end of the gantry and is pivotally mounted so as to tip a scrap container to discharge its contents into a furnace to be charged. The vertical movement of the plenum may be by hydraulic cylinders, rack and pinion, rope hoist or any other well known means.

In the foregoing general description, I have set out certain objects, purposes and advantages of my invention. Other objects, purposes and advantages will be apparent from the following description and the accompanying drawings in which:

FIGURE 1 is a side elevation of a preferred embodiment of a charging apparatus according to my invention;

FIGURE 2 is a front elevation of the apparatus of FIGURE 1; and

FIGURE 3 is a side elevation of a second embodiment of the apparatus according to my invention.

FIGURE 4 is a fragmentary side elevation of a third embodiment of my invention.

Referring to the drawings and particularly FIGURES 1 and 2, I have illustrated a typical BOF furnace 10 which is adapted to be tilted for charging. An elevated charging floor 11 runs from a loading area, not shown, to a position adjacent the furnace as shown. A trackway 11a is mounted on the charging floor and a second trackway 12 is mounted on a girder 13 forming a part of the building framework above the charging floor.

In the embodiment shown, a pair of spaced generally vertical gantry legs 14 are mounted on a sill 15, which sill is in turn mounted on wheels 16 adapted to run on trackway 11a.

In the form shown in FIGURES 1 and 2, girders 17 are mounted on top of legs 14 and are held in spaced-apart position by end ties 18 and 19 at the opposite ends thereof. The girders 17 are provided with a trolley trackway 20 adapted to carry a moving trolley 21 mounted on wheels 22 which roll on the trolley trackway 20. The trolley is provided with a cable hoist 23 having a main hook arrangement 24 adapted to engage trunions 25 on a ladle 26 or trunions 27 on a scrap box 28 as shown. A second or auxiliary lift cable 29 is suspended from trolley 21 and provided with an auxiliary hook 30. Lift cables 23 and 29 are operated from cable drums in the well known manner of lift trolleys. The end tie 19 is arranged in the embodiment illustrated so as to overlie rail 12 on girder 13. Wheels 31 are mounted on the end tie 19 to move on rail 12 to support the girder 17 in conjunction with legs 14 and sill 15 so that the assembly can be moved from a loading area to the furnace charging area. Wheels 16 and 31 are driven in the usual manner for gantry cranes.

A cab 35 is mounted on one girder to carry the operator and the necessary operating controls of the usual type. A plenum 36 is slidably mounted on scissors linkage 36a between columns 37 and 38 on sill 15 so that the plenum is guided in vertical movement. Preferably, the plenum is provided with a cable hoist 39 intermediate its ends operated by drum 40 on girders 17 so that the scrap box 28 carried on the plenum may be raised from a lower position, as shown in solid lines in FIGURE 1, to the elevated and tilted position, shown in chain lines in FIGURE 1, so that scrap contained therein may be discharged into the furnace.

The operation of the apparatus of this invention is as follows: A scrap box 28 is filled on the charging floor at the loading area. The apparatus of the invention is moved to the loading area. An empty scrap box 28 is removed by picking it from the plenum by means of hooks 24 engaging trunions 27 and lifting it vertically from the plenum. It is then placed on the floor at the loading area and the filled box is picked up by hooks 24 engaging trunions 27 and placed on the plenum on the lower position. A ladle 26 full of hot metal is then picked up by hooks 24 through trunions 25. The apparatus is then moved to the furnace with the loaded scrap box on the plenum and the full ladle in hooks 24. The furnace is tilted as shown in FIGURE 1 for charging; the plenum 36 is then raised so as to raise the scrap box 28 to the chain line position discharging the scrap into the furnace. The box is of such size that it contains the entire scrap charge necessary for the furnace. The plenum is then lowered and the trolley 21 moved on the bridge girder 17 to the left (FIGURE 1) to bring the ladle 26 adjacent the furnace 10. The auxiliary hook 30 is then engaged into a ring at the base of the ladle, as is usual in emptying ladles of molten metal. The cable 28 is raised and the ladle is tipped to discharge the hot metal through the spout 41 into the furnace 10. When the ladle is empty, the furnace is fully charged and is tilted back to the refining position. The apparatus is then returned to the loading area, the empty scrap box exchanged for a full box, the ladle filled with hot metal and the apparatus is ready to charge another furnace.

In the embodiment illustrated in FIGURE 3, I have shown a structure identical to that of FIGURES 1 and 2 except that the end of girders 17 opposite gantry legs 14 are supported on a pair of vertical legs 50, corresponding to legs 14, and a sill 51, corresponding to sill 15, are supported on wheels 53, corresponding to wheels 16, running on a rail 12a on the charging floor instead of on the overhead beam 13. The operation of the embodiment of FIGURE 3 is identical with that of FIGURES 1 and 2 and all corresponding like parts bear the same numbers with the addition of a prime sign.

In the embodiment of FIGURE 4 the structure is identical with that of FIGURES 1 and 2 except hydraulic cylinders 70 and 71 are used to lift and tilt scrap box 28″. The operation is identical with that of FIGURES 1 and 2 and corresponding parts bear the same numbers with a double prime sign.

While I have illustrated and described a present preferred embodiment of my apparatus in the foregoing specification, it will be understood that this invention may be otherwise embodied.

I claim:

1. A furnace charging apparatus for movement of a metal charge from a loading area to a charging area on a charging floor comprising girder means spaced above said charging floor, support means supporting said girder means and traversable on said charging floor from the loading area to a charging area in front of a furnace to be charged, a trolley movable on said girder means from end to end thereof, a hoist means on the trolley, a vertically movable lift means on the support means receiving a scrap box for vertical movement, means on said support means for tilting said scrap box on the said lift means to discharge the contents thereof, said hoist means having hook means adapted alternately to engage trunions on the scrap box and a molten metal ladle and means on the trolley adapted to dump a metal ladle on the hook means.

2. An apparatus as claimed in claim 1 wherein the support means for the girder are vertical gantry legs mounted on wheels.

3. An apparatus as claimed in claim 1 wherein the vertically movable lift means is a platform mounted at each end on hydraulic cylinders and adapted to be tilted thereby.

4. An apparatus as claimed in claim 1 wherein the support means for the girder are vertical gantry legs on wheels at one end of the girder and wheels at the other end bearing on a horizontal beam spaced above the charging floor.

5. An apparatus as claimed in claim 1 wherein the hoist means on the trolley is a cable and rotatable takeup drum.

6. An apparatus as claimed in claim 1 wherein the support means includes rails on the charging floor from the loading area to the charging area.

7. An apparatus as claimed in claim 1 wherein the means for dumping a metal ladle is a second hoist means on the girder.

8. An apparatus as claimed in claim 1 wherein the trolley is provided with drive means for moving on the girder.

References Cited

UNITED STATES PATENTS

| 2,836,309 | 5/1958 | McFeaters. |
| 3,179,265 | 4/1965 | Evascu et al. |
| 3,375,945 | 4/1968 | McCready et al. |

ROBERT G. SHERIDAN, Primary Examiner

U.S. Cl. X.R.

212—14, 130